(No Model.)
H. F. CRAWFORD & R. C. LAMBERT.
VELOCIPEDE.
No. 444,131. Patented Jan. 6, 1891.
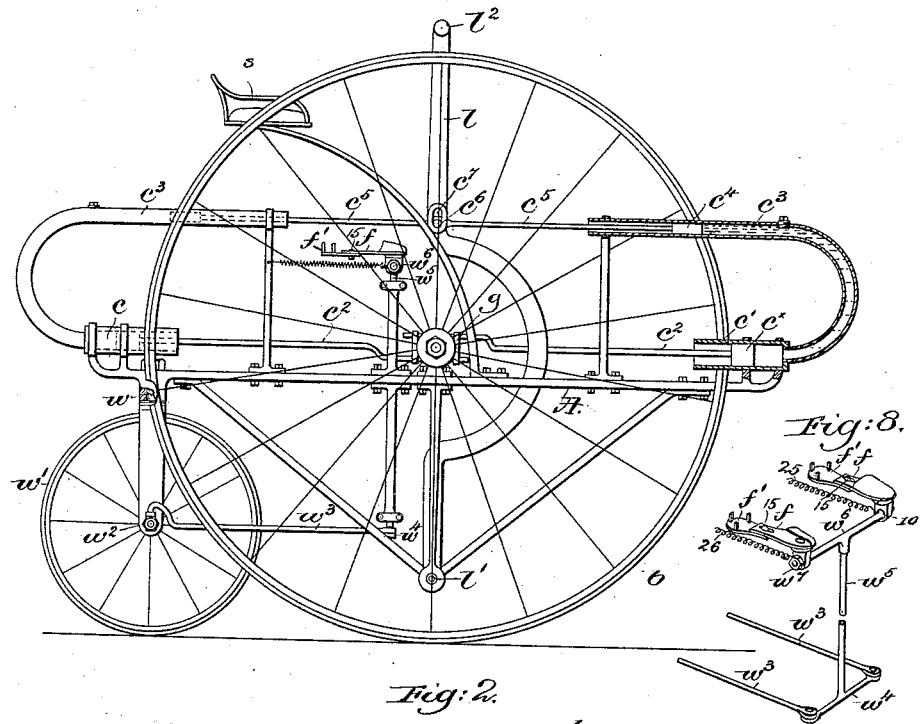
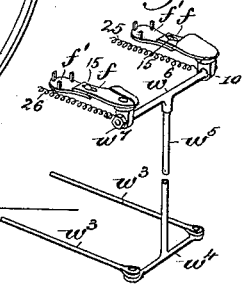
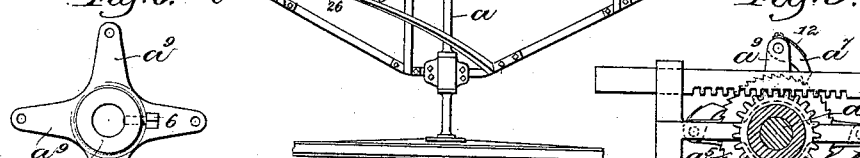
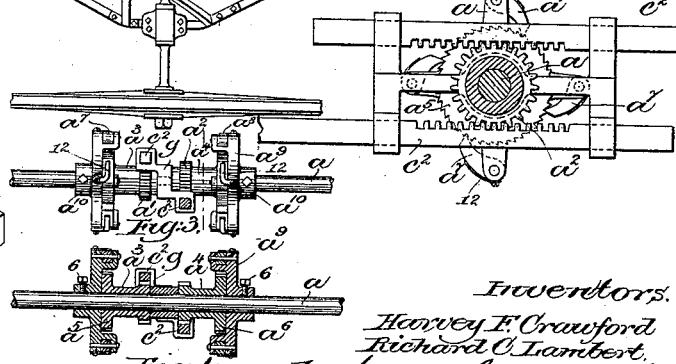

UNITED STATES PATENT OFFICE.

HARVEY F. CRAWFORD AND RICHARD C. LAMBERT, OF BROCKTON, MASSACHUSETTS; SAID LAMBERT ASSIGNOR OF ONE-THIRD OF HIS INTEREST TO SAID CRAWFORD.

VELOCIPEDE.

SPECIFICATION forming part of Letters Patent No. 444,131, dated January 6, 1891.

Application filed October 2, 1890. Serial No. 366,870. (No model.)

*To all whom it may concern:*

Be it known that we, HARVEY F. CRAWFORD and RICHARD C. LAMBERT, of Brockton, county of Plymouth, State of Massachusetts, have invented an Improvement in Velocipedes, of which the following description, in connection with the accompanying drawings, is a specification, like letters and figures on the drawings representing like parts.

This invention relates to driving or propelling mechanism for vehicles or velocipedes of the type shown and described in our application, Serial No. 356,316, filed June 23, 1890, and has for its object to improve the same by adapting it to operate a clutch mechanism instead of the crank which is there shown.

In accordance with this invention the axle carrying the driving-wheels is fitted with a suitable clutch mechanism operated by the reciprocating piston of a hydraulic cylinder, the water or other liquid being forced into the cylinder behind the piston by a plunger of small diameter actuated by a lever preferably operated by hand.

One part of our invention consists in the combination, with a frame, and a driving-axle having bearings therein and provided with a clutch mechanism, of a cylinder having a piston to operate the said clutch mechanism, a plunger for the said cylinder, and a lever to operate the said plunger, substantially as will be described.

Other features of our invention will be hereinafter pointed out in the claims at the end of this specification.

Figure 1 shows in side elevation and partial section a vehicle embodying this invention; Fig. 2, a top or plan view of the same; Figs. 3, 4, 5, 6, 7, and 8, details of the clutch mechanism to be referred to.

Referring to the drawings, A represents the frame of a vehicle, herein shown as a tricycle, the said frame having bearings for the usual driving-axle $a$, operating the driving-wheels $b$. The frame A, preferably at or near its opposite ends, carries the hydraulic cylinders $c\ c'$, arranged facing each other or the axle $a$ and fitted with pistons $c^{\times}$, (see Fig. 1,) whose piston-rods $c^2$ are suitably shaped and provided with teeth to engage and operate the toothed wheels $a'\ a^2$, loose on the driving-shaft $a$, (see Figs. 3 and 4,) the said piston-rods engaging the said wheels $a'\ a^2$ upon their upper and under sides, respectively, as shown, so that movement of the piston-rods in opposite directions will turn the toothed wheels $a'\ a^2$ in the same direction, as will be hereinafter described.

A yoke or guide-block $g$ (shown separately in Fig. 7) is supported loosely upon the driving-axle $a$ between the wheels $a'\ a^2$, said yoke having suitable guideways or openings 2, through which the piston-rods $c^2$ pass, the yoke serving as a guide for the outer ends of said piston-rods to keep the teeth thereon in engagement with the toothed wheels $a'\ a^2$. The toothed wheels $a'\ a^2$ are herein shown as formed upon or fast to the sleeves $a^3\ a^4$, loose on the driving-shaft, and provided with the ratchet-toothed wheels $a^5\ a^6$, engaged by pawls $a^7\ a^8$, pivoted to arms $a^9$, radiating from and preferably forming a part of the hubs $a^{10}$, (see Fig. 6,) made fast on the driving-axle $a$ by set-screws 6 or otherwise. Springs 12, carried by the arms $a^9$, bear upon the pawls $a^7\ a^8$ to keep them in engagement with the ratchet-teeth on the wheels $a^5\ a^6$. (See Fig. 5.)

The cylinders $c\ c'$ have connected to their outer ends pipes or tubes $c^3$, preferably bent or curved over, facing each other, as shown in Fig. 1, to receive the plungers $c^4$, herein shown as carried at opposite ends of the connecting-bar $c^5$, provided at or near its middle with a pin or stud $c^6$, working in a vertical slot $c^7$ in the lever $l$, herein shown as pivoted at $l'$ in the frame, and the said lever at its upper end is fitted with suitable handles $l^2$. The pipes $c^3$ and cylinders $c\ c'$ are filled with water or other liquid, and when the plungers $c^3$ are reciprocated by means of the lever $l$ the pistons in the cylinders will be reciprocated, their piston-rods $c^2$ operating through the clutch mechanism on the driving-shaft to turn the wheels $b$ to propel the vehicle.

The frame A, preferably at its rear end, is provided with a socket which receives the vertical spindle $w$, forked at its lower end and carrying the steering-wheel $w'$, the axle $w^2$ of which is extended longitudinally, and has swiveled to its ends the rods $w^3$, jointed at their opposite ends to the bar $w^4$, fast on the lower end of the vertical shaft $w^5$, mounted in suitable bearings in the frame and provided at its upper end with the cross-bar $w^6$.

The cross-bar $w^6$ (see Fig. 8) is threaded at its ends to receive the nuts $w^7$, between which and the shoulders 10 are clamped the blocks 13, to which are pivoted the foot-rests $f$.

The foot-rests $f$ are represented as made adjustable with relation to their length by providing the front or toe portions with a longitudinal slot to receive the bolt 15, movable with the heel portion $f'$, as shown.

In use the operator is seated upon the seat $s$, with his feet placed in the rests $f$, operating the clutch mechanism to propel the vehicle by the lever $l$, steering the same by the feet, and the foot-rests $f$, being pivoted to the cross-bar $w^6$, turn with relation to and independently thereof, so that the feet are not confined to the exact movements of the cross-bar, but may be given some freedom with relation thereto, and the angle in which the foot-rests stand may also be adjusted by means of the nuts $w^7$. The cross-bar $w^6$ is held in a central position by the action of two springs 25 26, one or the other of which yields as the cross-bar is turned in steering, the springs aiding in returning the same and its wheel always to a central position.

The advantages of the above construction over that shown and described in our application referred to are many, principal among which is that the lever $l$ may be held stationary while running down hill or "coasting," or it may be moved back and forth at will irrespective and independent of the wheels.

We do not confine this invention to the particular clutch mechanism shown, as any well-known clutch mechanism may be employed as well; neither do we desire to limit ourselves to the particular construction and arrangement of parts shown, as the same may be varied.

We claim—

1. The frame and the driving-axle having bearings therein and provided with clutch mechanism, combined with two cylinders having pistons to operate the said clutch mechanism, plungers for the said cylinders placed substantially in line, and mechanism to reciprocate the said plungers in unison, to operate substantially as described.

2. The frame and the driving-axle having bearings therein and provided with a clutch mechanism, combined with a cylinder having a piston, a connection between said piston and clutch mechanism, a plunger for said cylinder, and the lever $l$ to operate said plunger, substantially as described.

3. The frame, the driving-axle $a$, having bearings therein, and a clutch mechanism on said axle, combined with the cylinder $c$, piston $c^\times$, piston-rod $c^2$, plunger $c^4$, and lever $l$, to operate substantially as described.

4. The frame, the driving-wheels $b$, and the wheel $w'$, combined with the rods $w^3$, cross-bar $w^4$, shaft $w^5$, and the cross-bar $w^6$, having foot-rests, to operate substantially as described.

5. The frame, the driving-axle having bearings therein, and the wheel $w'$, combined with the axle $w^2$, rods $w^3$, cross-bar $w^4$, shaft $w^5$, cross-bar $w^6$, and the adjustable foot-rests $f$ pivoted thereto, to operate substantially as described.

6. The frame, driving-axle having bearings therein, and the wheels $b$ and $w'$, combined with the cross-bar $w^6$, and mechanism, substantially as described, intermediate said cross-bar and wheel $w'$ and the springs 25 26, to operate substantially as described.

7. In a velocipede, the steering-shaft $w^5$, the threaded cross-bar $w^6$, having shoulders 10, and the nuts $w^7$, combined with the blocks 13 and foot-rests carried thereby, substantially as described.

In testimony whereof we have signed our names to this specification in the presence of two subscribing witnesses.

HARVEY F. CRAWFORD.
RICHARD C. LAMBERT.

Witnesses:
JAS. H. CHURCHILL,
EMMA J. BENNETT.